United States Patent
Chang et al.

(10) Patent No.: US 9,372,587 B2
(45) Date of Patent: Jun. 21, 2016

(54) METHODS AND APPARATUS FOR ARRANGING ELECTRODE LAYERS AND ASSOCIATED ROUTING TRACES IN A SENSOR DEVICE

(71) Applicant: SYNAPTICS INCORPORATED, San Jose, CA (US)

(72) Inventors: Yi-Yun Chang, Tapei (TW); Chris Rehn, Tapei (TW); Yeh-Cheng Tan, Tapei (TW)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/462,126

(22) Filed: Aug. 18, 2014

(65) Prior Publication Data

US 2015/0145817 A1   May 28, 2015

Related U.S. Application Data

(60) Provisional application No. 61/908,807, filed on Nov. 26, 2013.

(51) Int. Cl.
 *G06F 3/044* (2006.01)

(52) U.S. Cl.
 CPC ...... *G06F 3/044* (2013.01); *G06F 2203/04103* (2013.01); *G06F 2203/04107* (2013.01); *G06F 2203/04108* (2013.01); *Y10T 29/49105* (2015.01)

(58) Field of Classification Search
 CPC ............ G06F 2203/04103; G06F 2203/04107; G06F 2203/04108; G06F 3/044; Y10T 29/49105
 USPC .................................. 345/173, 174; 29/622; 178/18.01–18.011
 See application file for complete search history.

(56) References Cited

U.S. PATENT DOCUMENTS

| | | | | |
|---|---|---|---|---|
| 4,550,221 A | * | 10/1985 | Mabusth | G06F 3/03547 178/18.06 |
| 8,557,508 B2 | * | 10/2013 | Li | G06F 3/044 216/17 |
| 8,629,841 B2 | * | 1/2014 | Degner | G06F 3/044 345/163 |
| 8,754,662 B1 | * | 6/2014 | Weng | G06F 3/044 324/686 |
| 8,963,856 B2 | * | 2/2015 | Liu | G06F 3/044 345/173 |

(Continued)

FOREIGN PATENT DOCUMENTS

KR    20150046494 A  *  4/2015

OTHER PUBLICATIONS

International Searching Authority, International Search Report and Written Opinion dated Mar. 4, 2013 for International Application No. PCT/US2012/060844.

(Continued)

*Primary Examiner* — Dmitriy Bolotin
(74) *Attorney, Agent, or Firm* — Osha Liang LLP (57) ABSTRACT

A capacitive input device including a substrate, a first plurality of sensor electrodes disposed proximate a top surface of the substrate and extending along a first direction, a second plurality of sensor electrodes disposed proximate a bottom surface of the substrate and extending along a second direction different from the first direction, and a plurality of routing traces coupled to the second sensor electrodes. Each routing trace is configured to extend along the first direction between respective first sensor electrodes, and to extend along the second direction underneath a second sensor electrode.

20 Claims, 4 Drawing Sheets

(56) References Cited

U.S. PATENT DOCUMENTS

| | | | |
|---|---|---|---|
| 9,081,453 B2* | 7/2015 | Bulea | G06F 3/044 |
| 2006/0260417 A1 | 11/2006 | Son et al. | |
| 2008/0064086 A1* | 3/2008 | Lee | B01L 3/50851 |
| | | | 435/289.1 |
| 2009/0159344 A1 | 6/2009 | Hotelling et al. | |
| 2009/0194344 A1 | 8/2009 | Harley et al. | |
| 2009/0236151 A1* | 9/2009 | Yeh | G06F 3/0412 |
| | | | 178/18.03 |
| 2009/0242283 A1* | 10/2009 | Chiu | G06F 3/044 |
| | | | 178/20.01 |
| 2010/0073319 A1 | 3/2010 | Lyon et al. | |
| 2010/0110031 A1 | 5/2010 | Miyazawa et al. | |
| 2010/0265193 A1 | 10/2010 | Kung et al. | |
| 2010/0265207 A1* | 10/2010 | Chen | G06F 3/0412 |
| | | | 345/174 |
| 2011/0012845 A1 | 1/2011 | Rothkopf et al. | |
| 2011/0094670 A1 | 4/2011 | Grunthaner | |
| 2011/0109590 A1 | 5/2011 | Park | |
| 2011/0132670 A1 | 6/2011 | Yeh et al. | |
| 2011/0141051 A1 | 6/2011 | Ryu | |
| 2012/0075201 A1* | 3/2012 | Golovchenko | G06F 1/1643 |
| | | | 345/173 |
| 2012/0092270 A1 | 4/2012 | Lyon et al. | |
| 2012/0188195 A1 | 7/2012 | Fang | |
| 2013/0154994 A1* | 6/2013 | Yang | G06F 3/044 |
| | | | 345/174 |
| 2013/0154996 A1* | 6/2013 | Trend | H03K 17/9622 |
| | | | 345/174 |
| 2013/0155059 A1* | 6/2013 | Wang | G06F 3/041 |
| | | | 345/419 |
| 2013/0299222 A1* | 11/2013 | Lee | G06F 3/044 |
| | | | 174/258 |
| 2014/0055379 A1* | 2/2014 | Ma | G06F 3/044 |
| | | | 345/173 |
| 2014/0131065 A1* | 5/2014 | Peng | H01B 1/00 |
| | | | 174/126.1 |
| 2014/0158507 A1* | 6/2014 | Park | G06F 3/044 |
| | | | 200/279 |
| 2014/0210784 A1* | 7/2014 | Gourevitch | H03K 17/962 |
| | | | 345/174 |
| 2014/0240617 A1* | 8/2014 | Fukutome | G02F 1/13338 |
| | | | 349/12 |
| 2014/0307186 A1* | 10/2014 | Yun | G06F 3/045 |
| | | | 349/12 |
| 2014/0352143 A1* | 12/2014 | Cok | G06F 3/044 |
| | | | 29/825 |
| 2015/0084907 A1* | 3/2015 | Burberry | G06F 3/046 |
| | | | 345/174 |
| 2015/0092359 A1* | 4/2015 | Kim | G06F 1/1643 |
| | | | 361/748 |
| 2015/0185940 A1* | 7/2015 | Han | G06F 3/044 |
| | | | 345/174 |

OTHER PUBLICATIONS

USPTO, Office Action in U.S. Appl. No. 13/527,390, mailed Feb. 12, 2014.

USPTO, Response to Office Action in U.S. Appl. No. 13/527,390, filed Apr. 18, 2014.

USPTO, Final Office Action in U.S. Appl. No. 13/527,390, mailed Jul. 1, 2014.

USPTO, Response to Final Office Action in U.S. Appl. No. 13/527,390, filed Aug. 5, 2014.

* cited by examiner

METHODS AND APPARATUS FOR ARRANGING ELECTRODE LAYERS AND ASSOCIATED ROUTING TRACES IN A SENSOR DEVICE

RELATED APPLICATION

This application claims the benefit of U.S. Provisional Application No. 61/908,807 filed Nov. 26, 2013.

TECHNICAL FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY

Various embodiments of the present invention provide input devices and methods that facilitate improved usability. In various embodiments, receiver electrodes are arranged along a first direction, and transmitter electrodes are arranged along a second direction different from (e.g., orthogonal to) the first direction. Routing traces extend along the first direction and couple the transmitter electrodes to a processing system. Each routing trace is configured to extend horizontally between adjacent receiver electrodes, and to extend vertically underneath (i.e., overlapping) a transmitter electrode, such that the transmitter electrodes shield the routing traces from the receiver electrodes. By configuring both the routing traces and the receiver electrodes to extend along the same direction, the edges of the sensing region are available for sensing input objects, unencumbered by routing traces.

BRIEF DESCRIPTION OF THE DRAWINGS

Preferred exemplary embodiments of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
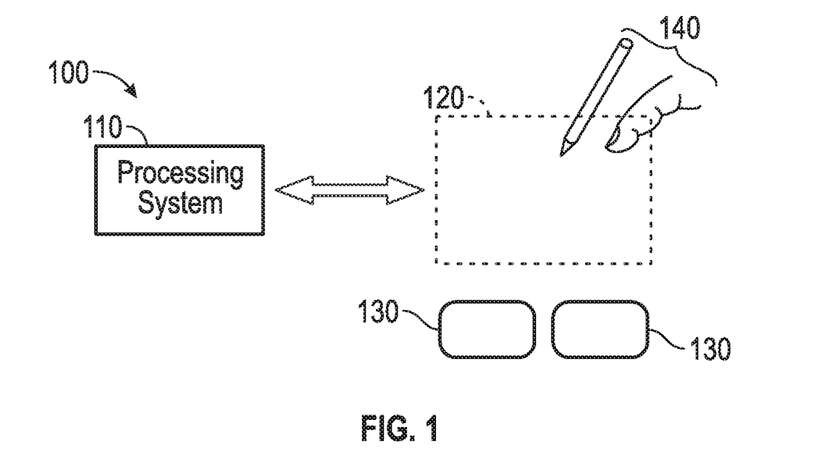
FIG. 1 is a block diagram of an exemplary system that includes an input device, in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor(s). This force information can then also be used by the system to provide a wide range of user interface functionality, for example, by providing different user interface functions in response to different levels of applied force by objects in the sensing region. Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

In some embodiments, the input device is comprises a sensor device configured to detect contact area and location of a user interacting with the device. The input sensor device may be further configured to detect positional information about the user, such as the position and movement of the hand and any fingers relative to an input surface (or sensing region) of the sensor device.

In some embodiments, the input device is used as an indirect interaction device. An indirect interaction device may control GUI actions on a display which is separate from the input device, for example a touchpad of a laptop computer. In one embodiment, the input device may operate as a direct interaction device. A direct interaction device controls GUI actions on a display which underlies a proximity sensor, for example a touch screen. There are various usability differences between indirect and direct more which may confuse or prevent full operation of the input device. For example, an indirect input device may be used to position a cursor over a button by moving an input object over a proximity sensor. This is done indirectly, as the motion of the input does not overlap the response on the display. In a similar case, a direct interaction device may be used to position a cursor over a button by placing an input object directly over or onto the desired button on a touch screen.

Figure 2:
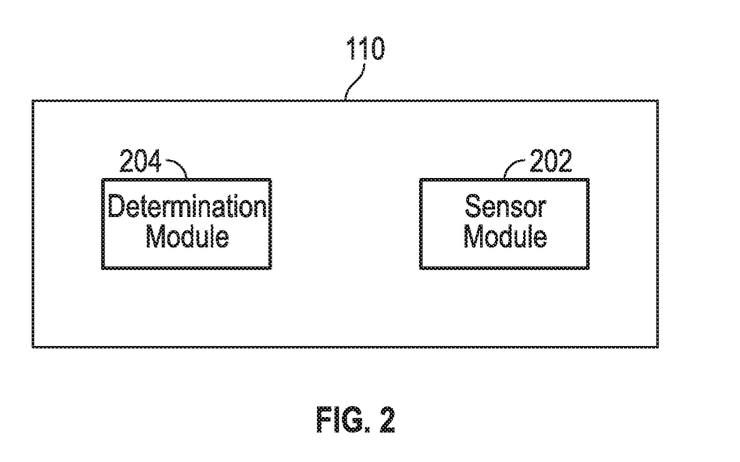
FIG. 2 is a block diagram of an input device, in accordance with an embodiment.

Referring now to FIGS. 1 and 2, the processing system 110 includes a sensor module 202 and a determination module 204. Sensor module 202 is configured to operate the sensors associated with the input device 100 and sensing region 120. For example, the sensor module 202 may be configured to transmit sensor signals and receive resulting signals from the sensors associated with sensing region 120. Determination module 204 is configured to process data (e.g. the resulting signals) and to determine positional information and force information for input objects interacting with the sensing region 120. The embodiments of the invention can be used to enable a variety of different capabilities on the host device. Specifically, it can be used to enable cursor positioning, scrolling, dragging, icon selection, closing windows on a desktop, putting a computer into sleep mode, or perform any other type of mode switch or interface action.

Figure 3:
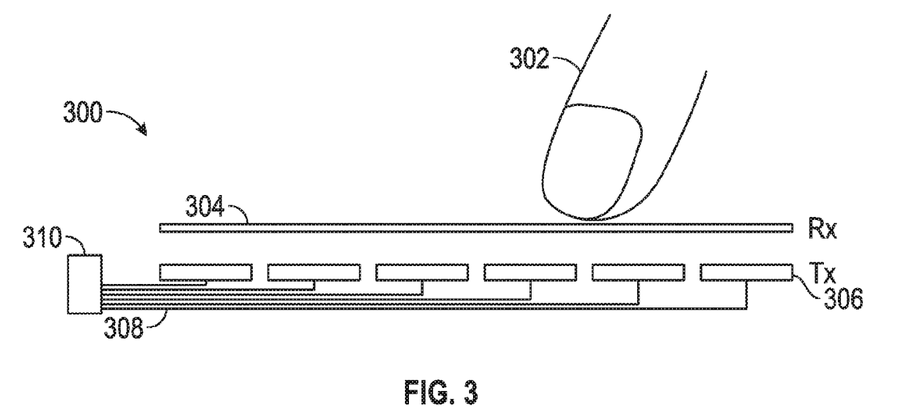
FIG. 3 is a cross section view of an exemplary sensor device stackup in which the receiver electrodes and transmitter electrodes are in different layers in accordance with an embodiment.

Referring now to FIG. 3, an input device 300 includes an input surface (omitted for clarity) configured to be touched by an input object 304 (e.g. a finger, stylus, etc.), a first array of sensor electrodes 304, a second array of sensor electrodes 306, and a layer of conductive material 308 (routing traces) configured to communicatively (ohmically) couple the second array of sensor electrodes 306 to a processing system 310. In some embodiments, for example, when the input device is performing trans-capacitive sensing, the first layer of sensor electrodes 304 are receiver electrodes (Rx) and the second layer of sensor electrodes 306 are transmitter electrodes (Tx). In the illustrated embodiment, the first and second arrays are disposed in different layers.

Figure 4:
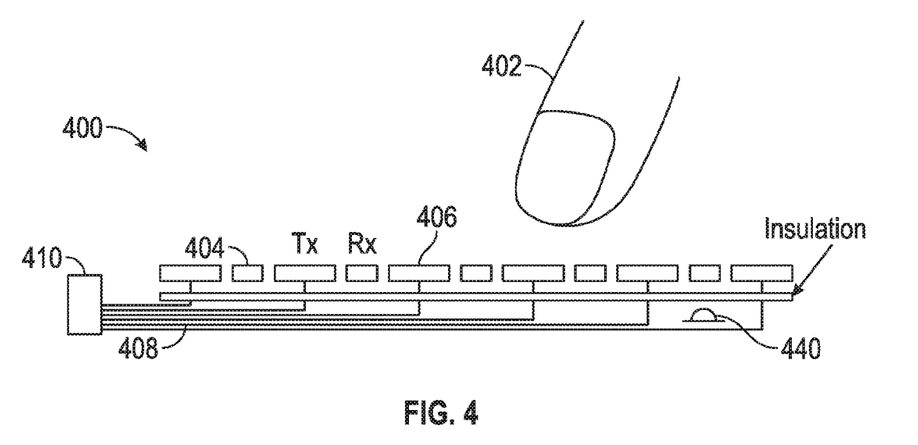
FIG. 4 is a cross section view of an exemplary sensor device stackup in which the receiver electrodes and transmitter electrodes are in the same layer in accordance with an embodiment.

FIG. 4 shows an input device 400 generally analogous to that depicted in FIG. 3, except that a first array of sensor electrodes 404 and a second array of sensor electrodes 406 are disposed in the same layer. In some embodiments, the input device may also include a tactile switch 440. A layer of routing traces 408 is configured to communicatively couple the second layer of sensor electrodes 406 to a processing system 410. The manner in which the first and second arrays may be disposed in the same layer or plane, while avoiding ohmic coupling therebetween, is described in greater detail below in conjunction with FIG. 6.

Figure 5:
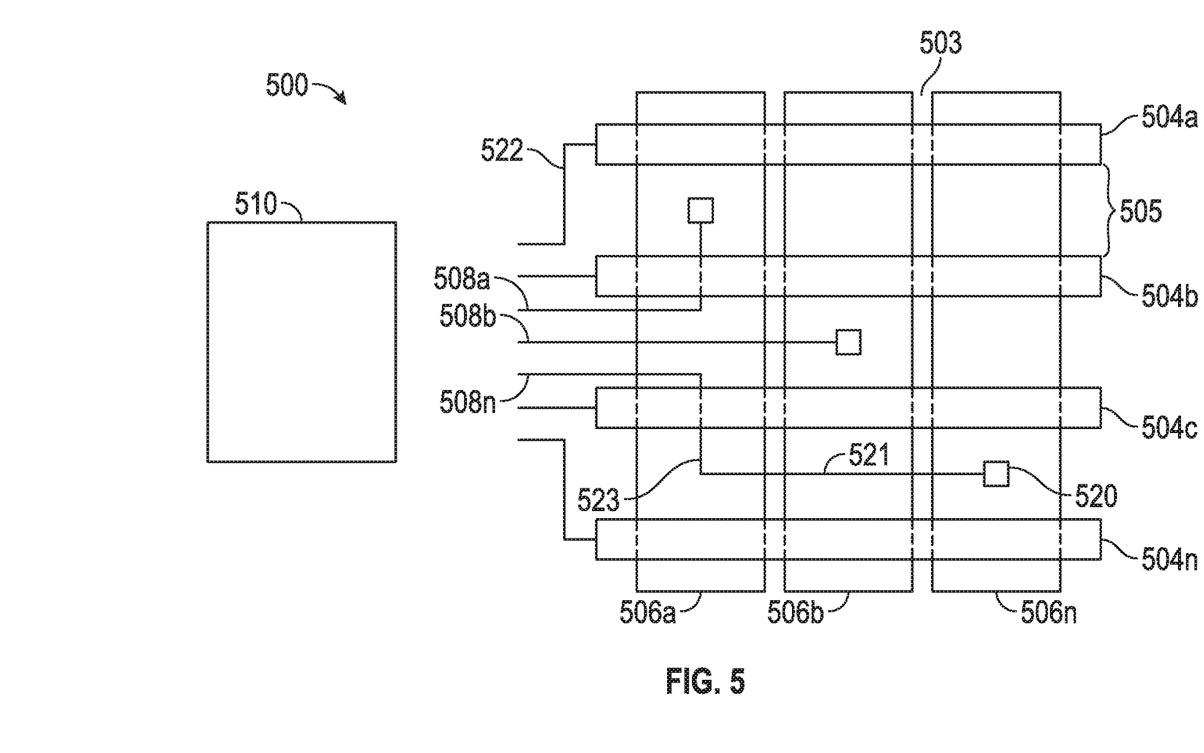
FIG. 5 is a schematic top view of the input device of FIG. 3 showing the relative orientations of a receiver electrode array, a transmitter electrode array, and transmitter routing traces in accordance with an embodiment.

FIG. 5 shows a top view of a portion of the input device shown in FIG. 3. More particularly, an input device 500 includes a first array of sensor electrodes 504(a), 504(b), 504(c)...504(n), a second array of sensor electrodes 506(a), 506(b)...506(n) each having an associated routing trace 508 for ohmic coupling to a processing system 510. In the illustrated embodiment, the first array of sensor electrodes 504 are configured to function as receiver electrodes, and the second array of sensor electrodes 508 are configured to function as transmitter electrodes.

In accordance with various embodiments, it is desirable to address the transmitter and receiver lines without compromising edge sensing; that is, the various electrodes are oriented so that neither the transmitter routing traces nor the receiver routing traces run along any of the edges of the sensing region. In the illustrated example, the first array of sensor electrodes 504 extend in a horizontal direction and the second layer of sensor electrodes 508 extend in a vertical direction. As such, both layers of sensor electrodes can extend to the edges of the input surface enabling accurate detection of input objects at the limits of the input surface (since no edge space is required for routing traces).

More particularly, each receiver electrode 504 has a receiver routing trace 522 extending therefrom (left side of FIG. 5) to couple the receiver electrodes to the processing system 510. In the illustrated example, the transmitter routing traces 508 are also configured to couple the transmitter electrodes 506 to the processing system 510 at the left edge of the sensing region. That is, the routing traces for the transmitter electrodes are configured to couple to a processing system from the same edge of the input device as the routing traces for the receiver electrodes. Furthermore, during transcapacitive sensing, the routing traces 508 for the transmitter electrodes 506 are inhibited from coupling to the receiver electrodes 504 in the first (top) layer because of the shielding provided by the transmitter electrodes 506 in the second (bottom) layer.

With continued reference to FIG. 5, each transmitter trace 508 is attached (electrically coupled) to a corresponding transmitter electrode 506 at an attachment 520. To the extent a transmitter routing trace 508 extends horizontally, it extends along a space 505 located between adjacent receiver electrodes 504 to thereby mitigate capacitive coupling between the transmitter routing trace 508 and the receiver electrodes 504.

By way of non-limiting example, the transmitter routing trace 508(n) is attached to the transmitter electrode 506(n) at attachment 520. A horizontal segment 521 of the trace 508(n) extends horizontally to the left between adjacent receiver electrodes 504(c) and 504(n) within the space 505. A vertical segment 523 of the trace 508(n) extends vertically underneath the transmitter electrode 506(a). Consequently, the horizontal extent of the trace 508(n) (i.e., segment 521) avoids capacitive coupling with receiver electrodes because it does not overlap any receiver electrodes; rather, it runs between them. Moreover, the vertical extent of the trace 508(n) (i.e., segment 523) avoids capacitive coupling with receiver electrodes, for example, where the segment 523 passes underneath the left end of the receiver electrode 504(n), because segment 523 is shielded by the transmitter electrode 506(a) disposed between the array of receiver electrodes and the transmitter routing traces.

Figure 6:
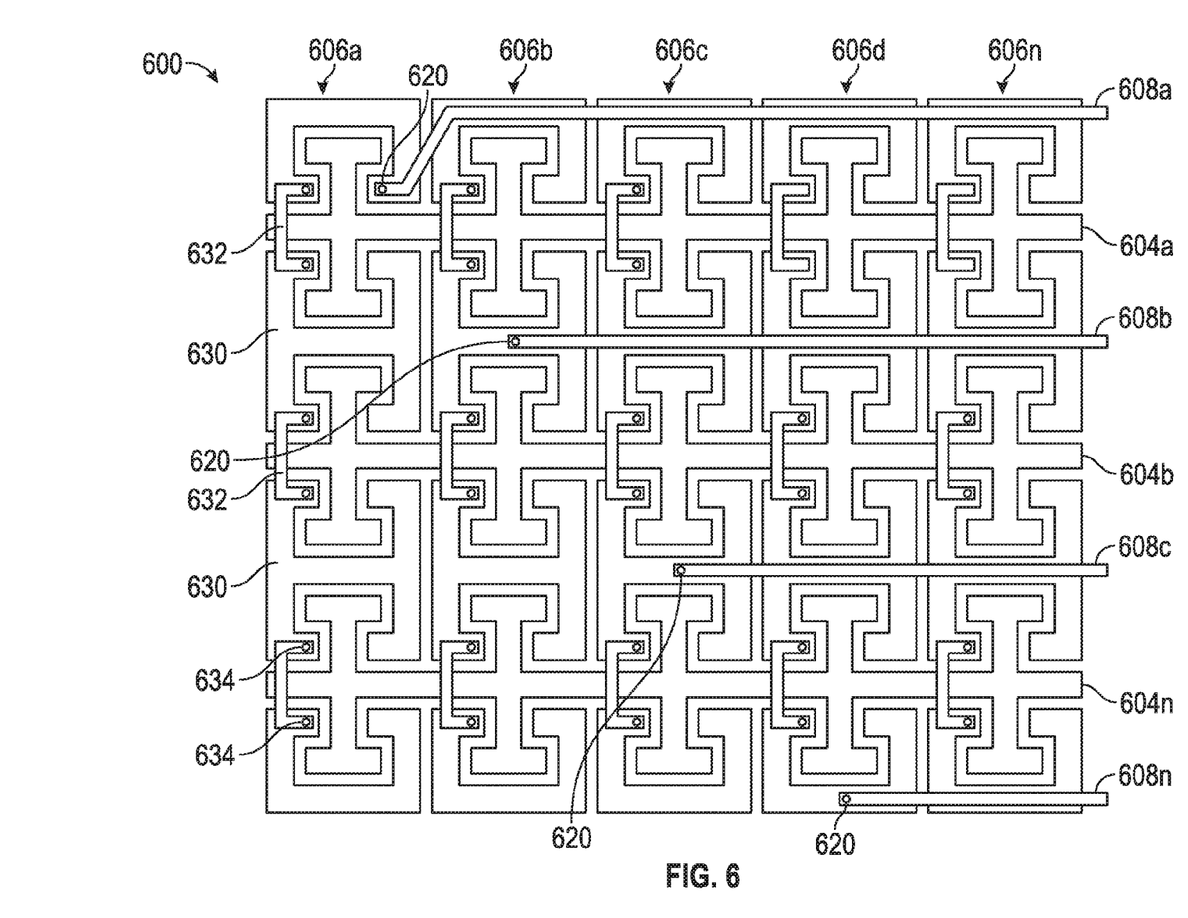
FIG. 6 is a schematic top view of the input device of FIG. 4 showing the relative orientations of a receiver electrode array, a transmitter electrode array including jumpers, and transmitter routing traces in accordance with an embodiment.

In an alternate embodiment, the transmitter and receiver electrode layers may be mounted on a single substrate such as, for example, on opposite sides of a single substrate or on the same side of a single substrate. FIG. 6 is a schematic top view of an input device 600 (generally analogous to device 400 of FIG. 4) showing the relative orientations of an array of receiver electrodes 604(*a*)-604(*n*), an array of transmitter electrodes 606(*a*)-606(*n*), and transmitter routing traces 608(*a*)-608(*n*). In the illustrated example, the array of receiver electrodes 604 and the array of transmitter electrodes 606 are patterned on the same side of a PCB substrate. In some embodiments, the sensor substrate can be PET, glass, or other substrates suitable for electrode deposition. One or both of the first and second arrays of sensor electrodes (604, 606) may be formed from copper, silver paste, copper paste and carbon ink by using any appropriate process such as screen printing, chemical etching or deposition. The layer of routing traces 608 are configured to ohmically couple to the transmitter electrodes and may be formed from a patterned layer of EMI shielding material which is coupled to the sensor substrate.

With continued reference to FIG. 6, the first array of sensor electrodes 604 extend in a horizontal direction and the second array of sensor electrodes 606 extend a vertical direction. By arranging at least a substantial portion of the transmitter routing traces 608 parallel to and between adjacent receiver electrodes 604, the first and second arrays of sensor electrodes 604, 606 can extend to the edges of the sensing region enabling accurate detection of input objects at the limits of the input surface. In this regard, each routing trace 604 is ohmically coupled to one sensor electrode 606 in the second array by an attachment 620. In various embodiments, each routing trace 608 is disposed as to not overlap any sensor electrode in the first array 604. By way of non-limiting example, the routing trace 608(*c*) is disposed between adjacent receiver electrodes 604(*b*) and 604(*n*) and extends from the attachment 620 to the right edge of the input device 600.

Furthermore, each transmitter electrode 606 comprises a plurality of sensor elements 630, with adjacent elements connected by a jumper 632 at respective jumper connections 634. In an embodiment, the sensor elements 630 are disposed on a first surface of the sensor substrate, and the jumpers 632 are disposed on a second, oppositely disposed surface of the same substrate. The jumper connections 634 extend through the substrate, for example, in the form of vias. In this way, the interconnected sensor elements 630 and jumpers 632 form ohmically coupled sensor electrodes 606, each extending in the vertical direction as shown in FIG. 6.

The first and second arrays of sensor electrodes 604, 606, the sensor elements 630, the jumpers 632, and the routing traces 608 may be formed of any suitable conductive material, such as ITO (Indium tin oxide), copper, silver ink, carbon ink, and the like. In one embodiment, for example, the array of sensor electrodes may be coupled to a flexible printed circuit board (FPC) which ohmically couples the array sensor electrodes to a processing system of the input device.

A capacitive input device is thus provided which includes: a substrate; a first plurality of sensor electrodes disposed proximate a top surface of the substrate and extending along a first direction; a second plurality of sensor electrodes disposed proximate a bottom surface of the substrate and extending along a second direction different from the first direction; and a plurality of routing traces coupled to the second sensor electrodes, each routing trace being configured to extend along the first direction between respective first sensor electrodes, and to extend along the second direction underneath a second sensor electrode.

In an embodiment, the second plurality of sensor electrodes are disposed between the first plurality of sensor electrodes and the plurality of routing traces such that the second plurality of sensor electrodes electromagnetically shield the first plurality of sensor electrodes from the plurality of routing traces.

In an embodiment, the second sensor electrodes are ohmically isolated from the first sensor electrodes.

In an embodiment, each routing trace is ohmically connected to a single one of the second sensor electrodes.

In an embodiment, the capacitive input device further includes a tactile switch configured to be actuated by downward pressure applied to the substrate by a user.

In an embodiment, the plurality of routing traces comprises a patterned layer of electromagnetic interference (EMI) shielding material deposited on the substrate.

In an embodiment, the second plurality of sensor electrodes and the routing traces are disposed on opposite sides of the substrate; the second plurality of sensor electrodes and the routing traces comprise at least one of copper, silver paste, copper paste and carbon ink; and the second plurality of sensor electrodes and the routing traces are formed by at least one of screen printing, chemical etching, and deposition.

In an embodiment, the capacitive input device further includes a processing system communicatively coupled to the first and second pluralities of sensor electrodes, and the processing system is configured to operate the first plurality of sensor electrodes as receiver electrodes and to operate the second plurality of sensor electrodes as transmitter electrodes.

In an embodiment, the capacitive input device further includes a substantially rectangular touch surface having respective first, second, third, and fourth edges; and a plurality of receiver routing elements extending along the first direction and coupling the first plurality of sensor electrodes to the processing system; wherein the receiver routing elements and the plurality of routing traces are disposed along the first edge and are not disposed along the second, third, and fourth edges.

In an embodiment, the first direction may be substantially orthogonal to the second direction.

In an embodiment, the capacitive input device further includes a printed circuit board (PCB) layer proximate the substrate, wherein: the second plurality of sensor electrodes are disposed between the bottom surface of the substrate and a top surface of the PCB layer; and each routing trace extends from a respective second sensor electrode, through a via formed in the PCB layer, and along a bottom surface of the PCB layer.

A trancapacitive input device is also provided which includes: an insulating substrate; a first array of sensor electrodes disposed on a top surface of the substrate and arranged in rows which extend along a first direction; a second array of sensor electrodes ohmically isolated from the first array and arranged in columns which extend along a second direction different from the first direction, each column comprising at least two adjacent electrode elements disposed on the top surface of the substrate, and a jumper disposed on a bottom surface of the substrate and interconnecting the two adjacent sensor electrode elements through vias formed in the substrate; and a plurality of routing traces disposed on the bottom surface of the substrate, each routing trace coupled to a column and extending along the first direction in an interior region of the substrate in non-overlapping relation to the first sensor electrode rows.

In an embodiment, each routing trace is ohmically connected to an electrode element.

In an embodiment, the capacitive input device further includes a processing system communicatively coupled to the first and second arrays and configured to operate the first array as receiver electrodes and the second array as transmitter electrodes.

In an embodiment, the capacitive input device may also include: a substantially rectangular touch surface having respective first, second, third, and fourth edges; and a plurality of receiver routing elements extending along the first direction and coupling the receiver electrodes to the processing system; where the receiver routing elements and the plurality of routing traces are disposed along the first edge and are not disposed along the second, third, and fourth edges.

In an embodiment, the first direction may be substantially orthogonal to the second direction.

In an embodiment, each routing trace is configured to extend along the first direction parallel to the first sensor electrodes, and configured to extend along the second direction substantially between adjacent columns of the second array of sensor electrodes.

In an embodiment, the jumper and routing traces are formed of at least one of indium tin oxide (ITO), copper, silver ink, and carbon ink.

A method of manufacturing a sensor device is also provided, the method including: depositing a plurality of rows of first sensor electrodes on a top surface of an insulating substrate, each row extending along a first direction; depositing a plurality of columns of second sensor electrode elements on the top surface, each column extending along a second direction different from the first direction; depositing a plurality of connecting elements on a bottom surface of the substrate; interconnecting each jumper to two adjacent sensor electrode elements through vias formed in the substrate; and depositing a plurality of routing traces on the bottom surface of the substrate, each routing trace coupled to a single electrode element in each column and extending along the first direction within an interior region of the substrate in non-overlapping relation to the first sensor electrode rows.

In an embodiment, the plurality of routing traces and the connecting elements comprise at least one of indium tin oxide (ITO), copper, silver ink, and carbon ink.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed:

1. A capacitive input device, comprising:
   a substrate;
   a plurality of receiver sensor electrodes disposed proximate a top surface of the substrate and extending along a first direction;
   a plurality of transmitter sensor electrodes disposed proximate a bottom surface of the substrate and extending along a second direction different from the first direction; and
   a plurality of routing traces coupled to the plurality of transmitter sensor electrodes, each routing trace being configured to extend along the first direction between respective sensor electrodes of the plurality of receiver sensor electrodes, and to extend along the second direction underneath the plurality of transmitter sensor electrodes.

2. The capacitive input device of claim 1, wherein the plurality of transmitter sensor electrodes are disposed between the plurality of receiver sensor electrodes and the plurality of routing traces such that the plurality of transmitter sensor electrodes electromagnetically shield the plurality of receiver sensor electrodes from the plurality of routing traces.

3. The capacitive input device of claim 1, wherein the plurality of transmitter sensor electrodes are ohmically isolated from the plurality of receiver sensor electrodes.

4. The capacitive input device of claim 1, wherein each routing trace is ohmically connected to a single one of the plurality of transmitter sensor electrodes.

5. The capacitive input device of claim 1, further comprising a tactile switch configured to be actuated by downward pressure applied to the substrate by a user.

6. The capacitive input device of claim 1, wherein the plurality of routing traces comprises a patterned layer of electromagnetic interference (EMI) shielding material deposited on the substrate.

7. The capacitive input device of claim 1, wherein:
   the plurality of transmitter sensor electrodes and the routing traces are disposed on opposite sides of the substrate;
   the plurality of transmitter sensor electrodes and the routing traces comprise at least one of copper, silver paste, copper paste and carbon ink; and
   the plurality of transmitter sensor electrodes and the routing traces are formed by at least one of screen printing, chemical etching, and deposition.

8. The capacitive input device of claim 1, further comprising a processing system communicatively coupled to the plurality of receiver sensor electrodes and the plurality of transmitter sensor electrodes.

9. The capacitive input device of claim 8, further comprising:
   a substantially rectangular touch surface having respective first, second, third, and fourth edges; and
   a plurality of receiver routing elements extending along the first direction and coupling the plurality of receiver sensor electrodes to the processing system;
   wherein the plurality of receiver routing elements and the plurality of routing traces are disposed along the first edge and are not disposed along the second, third, and fourth edges.

10. The capacitive input device of claim 1, wherein the first direction is substantially orthogonal to the second direction.

11. The capacitive input device of claim 1, further comprising a printed circuit board (PCB) layer proximate the substrate, wherein:
   the plurality of transmitter sensor electrodes are disposed between the bottom surface of the substrate and a top surface of the PCB layer; and
   each routing trace extends from a respective second sensor electrode, through a via formed in the PCB layer, and along a bottom surface of the PCB layer.

12. A trancapacitive input device, comprising:
   an insulating substrate;
   an array of receiver sensor electrodes disposed on a top surface of the substrate and arranged in rows which extend along a first direction;
   an array of transmitter sensor electrodes ohmically isolated from the array of receiver sensor electrodes and arranged in columns which extend along a second direction different from the first direction, each column comprising at least two adjacent electrode elements disposed on the top surface of the substrate, and a jumper disposed on a bottom surface of the substrate and interconnecting the at least two adjacent sensor electrode elements through vias formed in the substrate; and a plurality of routing traces disposed on the bottom surface of the substrate, each routing trace coupled to a column of the array of transmitter sensor electrodes and extending along the first direction in an interior region of the substrate in non-overlapping relation to the array of receiver sensor electrodes.

13. The trancapacitive input device of claim 12, wherein each routing trace is ohmically connected to an electrode element.

14. The trancapacitive input device of claim 12, further comprising a processing system communicatively coupled to the array of receiver sensor electrodes and the array of transmitter sensor electrodes.

15. The trancapacitive input device of claim 14, further comprising:
 a substantially rectangular touch surface having respective first, second, third, and fourth edges; and
 a plurality of receiver routing elements extending along the first direction and coupling the array of receiver electrodes to the processing system;
 wherein the plurality of receiver routing elements and the plurality of routing traces are disposed along the first edge and are not disposed along the second, third, and fourth edges.

16. The trancapacitive input device of claim 12, wherein the first direction is substantially orthogonal to the second direction.

17. The trancapacitive input device of claim 12, wherein each routing trace is configured to extend along the first direction parallel to the array of receiver sensor electrodes, and configured to extend along the second direction substantially between adjacent columns of the array of transmitter sensor electrodes.

18. The trancapacitive input device of claim 12, wherein the jumper and routing traces are formed of at least one of indium tin oxide (ITO), copper, silver ink, and carbon ink.

19. A method of manufacturing a sensor device, comprising:
 depositing a plurality of rows of receiver sensor electrode elements on a top surface of an insulating substrate, each row extending along a first direction;
 depositing a plurality of columns of transmitter sensor electrode elements on the top surface, each column extending along a second direction different from the first direction;
 depositing a plurality of connecting elements on a bottom surface of the insulating substrate;
 interconnecting each jumper to two adjacent sensor electrode elements through vias formed in the insulating substrate; and
 depositing a plurality of routing traces on the bottom surface of the insulating substrate, each routing trace coupled to a single electrode element in a column from the plurality of columns and extending along the first direction within an interior region of the insulating substrate in non-overlapping relation to the plurality of rows of receiver sensor electrode elements.

20. The method of claim 19, wherein the plurality of routing traces and the plurality of connecting elements comprise at least one of indium tin oxide (ITO), copper, silver ink, and carbon ink.

* * * * *